C. D. BENNETT.
HOSE CLAMP.
APPLICATION FILED NOV. 20, 1917.

1,266,655.

Patented May 21, 1918.

INVENTOR
Clarence D Bennett
BY
Hardway Carter
ATTORNEYS

UNITED STATES PATENT OFFICE.

CLARENCE D. BENNETT, OF GOOSE CREEK, TEXAS.

HOSE-CLAMP.

1,266,655.　　　　　Specification of Letters Patent.　　Patented May 21, 1918.

Application filed November 20, 1917. Serial No. 202,924.

*To all whom it may concern:*

Be it known that I, CLARENCE D. BENNETT, a citizen of the United States, residing at Goose Creek, in the county of Harris and State of Texas, have invented certain new and useful Improvements in Hose-Clamps, of which the following is a specification.

This invention relates to new and useful improvements in a hose clamp.

The object of the invention is to provide a device of the character described which will securely clamp the end of a hose to the nipple whereby the hose is connected to a swivel, pump or wherever else it is desired to connect the same. The clamp is used, however, most commonly in connection with securing the hose to a nipple which in turn is connected to a swivel commonly used in drilling oil and other deep wells.

In the drilling of wells the swivel is usually suspended from the top of the derrick and the hose connected thereto by means of the nipple referred to, but on account of the pressure of fluid in the hose and the weight thereof, the hose is often detached from the nipple end, together with its metallic connections and falls down upon the derrick floor and is liable to injure the workmen.

It is the object of this invention to provide a clamp which is provided with yieldable slips, which securely clamp the hose to prevent the separation of the hose from the nipple and in its preferred form, the clamp is so constructed that the metallic parts will be fastened to the nipple and will not fall, in case of the detachment of the hose.

With the above and other objects in view the invention has particular relation to certain novel features of construction, arrangement of parts and use, an example of which is given in this specification and illustrated in the accompanying drawings wherein:—

Figure 4:
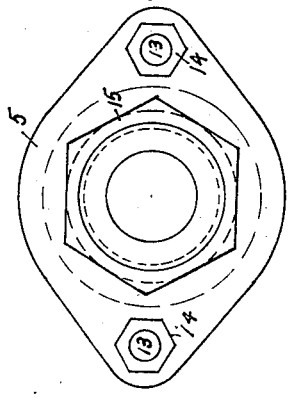
Fig. 4 is an end view of said modified form.
Figure 3:
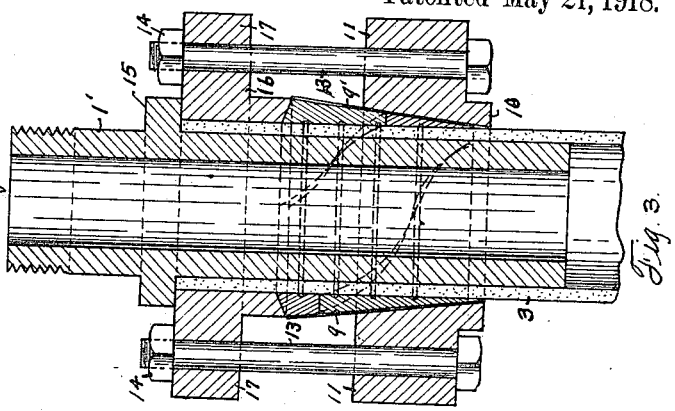
Fig. 3 is a longitudinal sectional view of a modified form thereof.
Figure 5:
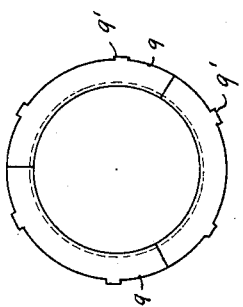
Figs. 5 and 6 are end and side views, respectively, of the slips employed.
Figure 6:
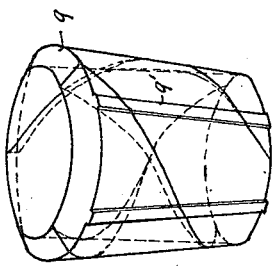
Figure 7:
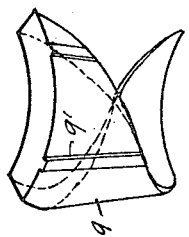
Fig. 7, is a side view of one of the slips.
Figure 2:
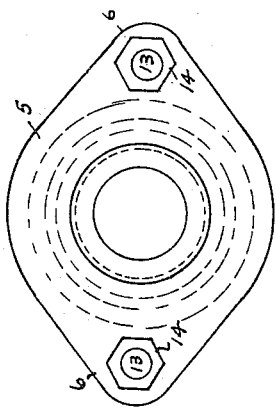
Fig. 2 is an end view thereof.
Figure 1:
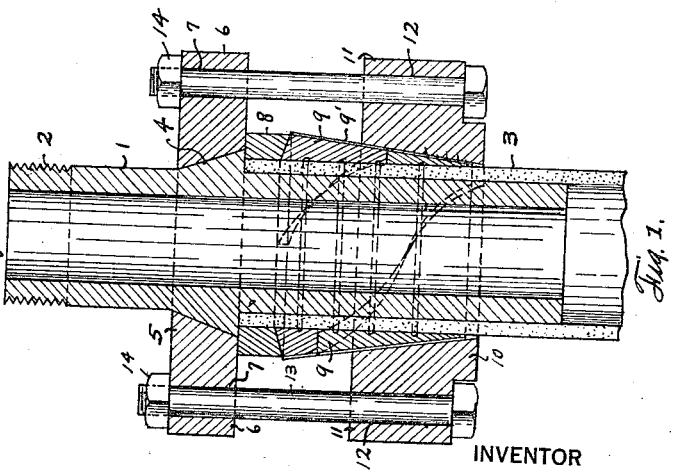
Figure 1 is a longitudinal sectional view of the preferred form of clamp.

Referring now more particularly to the drawings wherein like numerals of reference designate similar parts in each of the figures, the numeral 1 refers to a nipple one end of which is threaded at 2 and, in use is screwed into the corresponding part of the swivel. The hose 3 fits over the opposite end of said nipple and its free end abuts against the abrupt side of the annular shoulder 4, which is integral with said nipple, the other side of this shoulder is sloping, the shoulder being wedge shaped in cross section and a ring 5 is fitted over the nipple and rests against the sloping face of said shoulder 4, said ring being provided with the lateral ears 6, 6, having the corresponding orifices 7, 7, therethrough.

Surrounding the end of the hose and resting against the abrupt side of the shoulder 4 is the ring 8, provided to support the wedge shaped spiraled slips 9. These slips are spiraled and fit around the hose each one reaching slightly more than half the distance therearound and they are slightly flexible so as to grip the hose when the clamp is fitted thereover as hereinafter explained. The adjacent side of the ring 8 is slightly concave to conform to and receive the adjoining ends of the slips. The inner sides of these slips are milled or roughened so as to engage with the hose and said clamp member 10 is provided to fit over the slips and the central orifice and converges to conform to the contour of said slips. The outside of the slips have lengthwise ribs 9', spaced a uniform distance apart therearound to hold the clamp member 10 spaced therefrom to lessen the friction thereof against the slips. This clamp member has lateral ears 11, 11, having the orifices 12, 12, alined with the corresponding orifices 7, 7, of the ears 6, 6. Bolts 13, 13, pass through these corresponding orifices whose free ends are threaded to receive the nuts 14, 14, by means of which the clamp member 10 may be forced toward the ring 5 so as to firmly clamp the hose end to the nipple. In case said hose should become detached from the nipple, it will fall to the derrick floor but all of the metallic parts will be sustained by the nipple, thus lessening the liability of injuring the workmen.

In the modified form I have shown a nipple 1' now in common use, with a modified form of my clamp applied thereto. This nipple has the shoulder 15, preferably square or hexagonal so as to receive a wrench. The hose 3 is fitted over the nipple end and its free end rests against said shoulder. Surrounding the free end of the hose is the ring 16 having the lateral ears 17, 17. The slips 9 in this form of device are clamped against the hose by the clamp member 10 as hereinbefore explained, said member being secured in position by means of the bolts 13, 13, as hereinbefore specified.

While the two forms of clamp herein described are specially adapted for use in connecting a hose to a swivel, they may also be used in any place where it is desired to effect hose connections.

What I claim is:

1. In a device of the character described, the combination with a nipple of a hose fitted over one end of said nipple, a clamp member fitted over said hose, flexible slips spiraled in form, interposed between the clamp member and hose, whereby the hose is securely clamped on the nipple.

2. In a device of the character described, the combination with a nipple of a hose, fitted over the nipple end, a clamp member surrounding said hose, a plurality of flexible spiraled wedge shaped slips interposed between the clamp member and hose, a ring carried by the nipple and means connecting said ring and clamp member through which the latter may be adjusted toward and from the former.

3. In a device of the character described, the combination with a nipple of a hose, one end of which is fitted over the nipple and a ring surrounding the free end of the hose, a plurality of flexible wedge shaped slips surrounding the hose and supported by said ring, a clamp member fitted over said slips and means for securing said clamp member in position on said slips.

4. In a device of the character described, the combination with a nipple, of a hose fitted over the nipple and a clamp member fitted over the hose, a plurality of flexible spiraled wedge shaped slips interposed between the clamp member and hose and adjusting means connecting the clamp member to the nipple and whereby said clamp member may be adjusted relative to said slips.

5. In a device of the character described, the combination with a nipple having an annular shoulder, of a hose fitted over one end of the nipple, a ring fitted over the nipple and resting against one side of said shoulder, a ring fitted around the hose end and resting against the opposite side of said shoulder, flexible wedge shaped spiraled slips, fitted around the hose and supported upon said last mentioned ring, a clamp member fitted around and clamping said slips and means connecting the first mentioned ring and clamp member.

In testimony whereof I have signed my name to this specification in the presence of two subscribing witnesses.

CLARENCE D. BENNETT.

Witnesses:
E. V. HARDWAY,
JAS. W. OLIVER.

Copies of this patent may be obtained for five cents each, by addressing the "Commissioner of Patents, Washington, D. C."